(12) United States Patent
Brandstein et al.

(10) Patent No.: US 6,243,471 B1
(45) Date of Patent: *Jun. 5, 2001

(54) METHODS AND APPARATUS FOR SOURCE LOCATION ESTIMATION FROM MICROPHONE-ARRAY TIME-DELAY ESTIMATES

(75) Inventors: Michael S. Brandstein; John E. Adcock, both of Providence; Harvey F. Silverman, East Greenwich, all of RI (US)

(73) Assignee: Brown University Research Foundation, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/055,556

(22) Filed: Apr. 6, 1998

Related U.S. Application Data

(63) Continuation of application No. 08/399,427, filed on Mar. 27, 1995, now Pat. No. 5,737,431.

(51) Int. Cl.[7] .................................................. H04R 3/00
(52) U.S. Cl. .............................. 381/92; 381/122; 348/14; 348/15; 348/169
(58) Field of Search ............................... 348/14–15, 169; 381/91–92, 26, 122, 306, 56, 333

(56) References Cited

U.S. PATENT DOCUMENTS

| | | | |
|---|---|---|---|
| 4,980,761 | * | 12/1990 | Natori ..................................... 348/15 |
| 5,335,011 | * | 8/1994 | Addeo et al. ........................... 348/15 |
| 5,526,433 | * | 6/1996 | Zakarauskas et al. ................. 381/92 |

FOREIGN PATENT DOCUMENTS

WO 95/29479 * 11/1995 (WO).

OTHER PUBLICATIONS

International Preliminary Examination Report issued from the IPEA on May 14, 1997 in connection with International Application No. PCT/US96/03275.*
International Search Report issued from the International Searcing Authority on Aug. 23, 1996 in connection with International Application No. PCT/US96/03275.*

* cited by examiner

Primary Examiner—Duc Nguyen
(74) Attorney, Agent, or Firm—Lahive & Cockfield, LLP; Peter C. Lauro, Esq.; David J. Rikkers, Esq.

(57) ABSTRACT

Apparatus for determining the location of a signal-generating source (e.g., a conferee in a telephone conference) includes at least three sensors (e.g., microphones) arranged in a plurality of sets, each having two or more sensors. A surface-finding element responds to receipt at each sensor set of signals (e.g., speech) from the source for identifying a geometric surface (e.g., the surface of a hyperboloid or cone) representing potential locations of the source as a function of sensor locations and time difference of arrival of the signals. A location-approximating element coupled to two or more of the sets identifies a line that further defines potential source locations at the intersection of the surfaces. A location signal representing those potential locations is generated in accord with parameters of that line. Further functionality generates generating the location signal as a function of closest intersections the plural ones of the aforementioned lines.

23 Claims, 7 Drawing Sheets

METHODS AND APPARATUS FOR SOURCE LOCATION ESTIMATION FROM MICROPHONE-ARRAY TIME-DELAY ESTIMATES

REFERENCE TO RELATED APPLICATION

This application is a continuation of U.S. patent application Ser. No. 08/399,427, filed Mar. 7, 1995 (Attorney Docket No. BRE-057), the teachings of which are incorporated herein by reference now U.S. Pat. No. 5,737,431.

REFERENCE TO APPENDICES

The disclosure of this patent document contains material which is subject to copyright protection. Once the patent document or the patent disclosure are duly released from secrecy in accord with standard procedure of the U.S. Patent and Trademark Office, the owner has no objection to facsimile reproduction by anyone of the patent document or the patent disclosure, as it appears in the U.S. Patent and Trademark Office patent file or records, but otherwise reserves all copyright rights whatsoever.

FIELD OF INVENTION

The invention pertains to sensor arrays and, more particularly, to methods and apparatus for locating a source based on receipt of signals generated by it at a sensor array. The invention has application, for example, in steering cameras for video teleconferencing.

BACKGROUND OF THE INVENTION

An array microphones (or other sensors) can be advantageously used to detect sounds (or other transmitted energy waves) emitted by objects. An advantage of using an array, as opposed to a single such sensor, is that its output can be electronically processed to emphasize sounds from a particular location and to de-emphasize sounds from other locations—in other words, to reduce background noise. One form of electronic processing is beamforming, which makes it possible to electronically "steer" an array by emphasizing sounds from objects as they move from location to location.

For these reasons, a microphone array can be advantageously used to pick up speech in situations such as teleconferences, where hands-free speech acquisition is desired, where there are multiple talkers or where there the talkers are moving. Through the use of beamforming and other such techniques, the array's directivity pattern can be updated rapidly to follow a moving talker or to switch between several alternating or simultaneous talkers.

The increased popularity of multimedia (or video) teleconferencing presents the art with new challenges. In addition to speech, manufacturers and service providers must provide conference participants with quality images of one another. Conventionally, only single, fixed camera installed at each site to obtain those images. This is problematic where there are more than a few conferees, especially, where those conferees are situated around a large area (e.g., a conference table) or are pacing about.

An object of this invention is to resolve this and related problems by providing methods and apparatus for steering cameras used in a teleconferencing system. A still more particular object is to provide such systems as will automatically steer the camera toward an active talker in the teleconference.

A more general object of the invention provide improved methods and apparatus for locating a source that emits sounds, or other such energies.

Still another object of the invention is to provide source localization systems that can be readily and inexpensively implemented using current digital data processing and/or signal processing technologies.

Yet another object is to provide such systems as can be readily implemented in connection with beamforming or other such steering circuitry.

SUMMARY OF THE INVENTION

The invention meets the foregoing objects, among others, by providing in one aspect an apparatus for determining the location of a signal-generating source (e.g., a conferee in a telephone conference). The apparatus includes at least three sensors (e.g., microphones) arranged in a plurality of sets, each having two or more sensors. A surface-finding element responds to receipt at each sensor set of signals (e.g., speech) from the source for identifying a geometric surface (e.g., the surface of a hyperboloid or cone) representing potential locations of the source as a function of sensor locations and time difference of arrival of the signals. A location-approximating element coupled to two or more of the sets identifies a line that further defines potential source locations at the intersection of the surfaces. A location signal representing those potential locations is generated in accord with parameters of that line.

In a further aspect of the invention, the sensor sets each include two sensors and at least two of those sets are orthogonally centered with respect to one another. For each such orthogonally centered set, the midpoint of the locations of one of the sensor sets is substantially aligned with the midpoint of the other and the line segments defined by those pairs are substantially perpendicular to one another. Put in other way, the sensors lie on the endpoints of a cross ("+") configuration.

For each sensor set (e.g., two microphones), the surface-finding element includes functionality for identifying, as potential source locations, a substantially conical surface having a direction angle $\theta$ defined as a function of a speed of propagation of the signal from the source, a measured time difference of arrival of that signal at the sensors of the sensors set, a location of a first sensor in the sensor set, and a location of a second sensor in the sensor set.

For each pair of sensor sets (e.g., four microphones), the surface-finding element can include functionality for identifying, as potential source locations, a line defining an intersection of conical surfaces associated with each sensor set (e.g., two microphones). That line, more particularly, is defined as having direction angles $\alpha$, $\beta$ and $\gamma$ from the centerpoint of the sensor sets (e.g., the center of the cross configuration).

According to further aspects of the invention, the location-approximating element includes functionality for generating the location signal as a function of closest intersections the plural ones of the aforementioned lines. This functionality can identify points of closest intersection, $s_{jk}$ and $s_{jk}$, of two such lines, $l_j$ and $l_k$, as a function of a vector of cosines of direction angles $\alpha_j$, $\beta_j$ and $\gamma_j$ of the line $l_j$ from the centerpoint of the corresponding pair of sensor sets rotated relative to a global coordinate system, a vector of cosines of direction angles $\alpha_k$, $\beta_k$ and $\gamma_k$ of the line $l_k$ from the centerpoint of the corresponding pair of sensor sets rotated relative to a global coordinate system, locations of the centerpoints of the pairs of sensor sets, a range of a point on the line $l_j$ from the corresponding pair of sensor sets, and a range of a point on the line $l_k$ from the corresponding pair of sensor sets.

In still further aspects of the invention, the location signal is generated as a weighted function of closest intersections the plural ones of the aforementioned lines. Thus, that signal can be generated as a function of a point ŝ defined as a function of a number of pairs of sensor sets, a location of the first sensor in the first sensor set of the lth sensor set pair, a location of the second sensor in the first sensor set of the lth sensor set pair, a location of the first sensor in the second sensor set of the lth sensor set pair, a location of the second sensor in the second sensor set of the lth sensor set pair, a measured time difference of arrival of the source signal at the sensors of a first sensor set of the lth pair of sensor sets, a measured time difference of arrival of the source signal at the sensors of a second sensor set of the lth pair of sensor sets, a variance of a measured time difference of arrival of the source signal at the sensors of a first sensor set of the lth pair of sensor sets, and a variance of a measured time difference of arrival of the source signal at the sensors of a second sensor set of the lth pair of sensor sets.

In still other aspects, the invention provides an apparatus for steering a camera for use in a video teleconferencing system. The apparatus can be configured and operated in accord with that described above, wherein the aforementioned sensors are microphones and wherein the apparatus includes further functionality for steering the camera as a function of said location signal.

Other aspects of the invention provide methods for determining a location of a source that generates source signals and for steering a camera for use in a video teleconferencing system paralleling operation of the apparatus described above.

BRIEF DESCRIPTION OF THE DRAWINGS

A further understanding of the invention may be attained by reference to the drawings, in which.

DETAILED DESCRIPTION OF THE ILLUSTRATED EMBODIMENT

Figure 1:
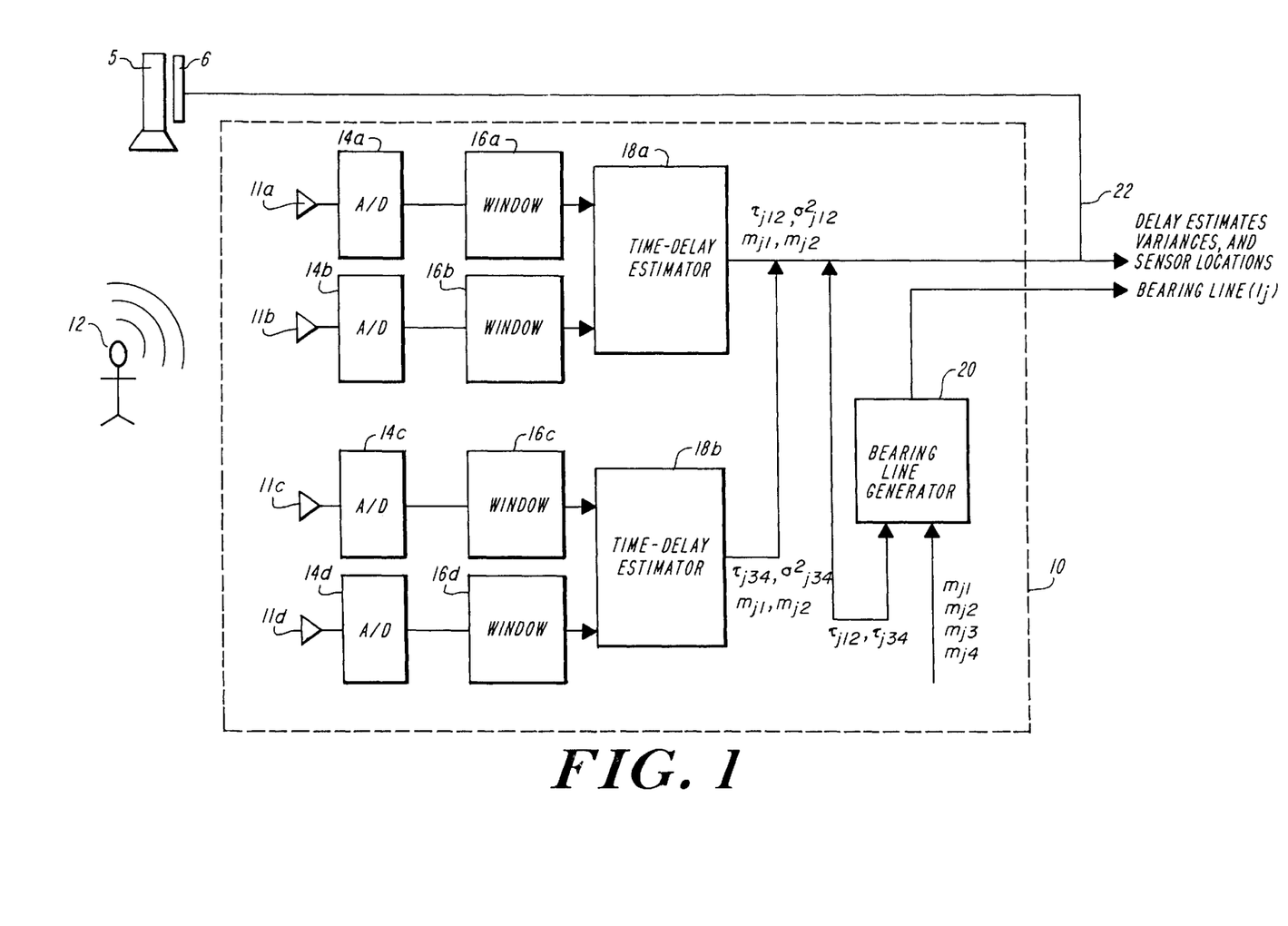
FIG. 1 depicts a quadruple-sensor apparatus for source localization according to the invention.

FIG. 1 depicts a quadruple-sensor apparatus for source localization 10 according to the invention. The quadruple-sensor apparatus 10 includes sensors 11a, 11b, 11c, 11d for receiving signals generated by a source 12. Apparatus 10 also includes signal processing elements for determining the location of that source based on receipt of those signals by the sensors. Signals generated by the apparatus identifying that location can be used in tracking the source 12.

For example, as illustrated in FIG. 1, quadruple-sensor apparatus 10 can be used in a multimedia teleconferencing system to continuously identify the location of an active speaker so that he or she can be tracked by an accompanying video camera 5 (via stepping motor 6). The speakers image, and voice, can then be transmitted to other teleconference participants via conventional video teleconferencing equipment and transmission lines (not shown). By way of further example, apparatus 10 can be used in theatres or functional halls to track positions, again, of an active speaker for purposes of steering spotlight toward him or her. These and other such uses of the invention are evident herein.

Sensors 11a–11d are conventional signal acquisition devices, such as microphones, sonar phones, antenna, imaging devices, etc. Where the quadruple-sensor apparatus 10 is used in connection with video teleconferencing, for example, the sensors are conventional microphones designed for picking up speech.

Figure 2:
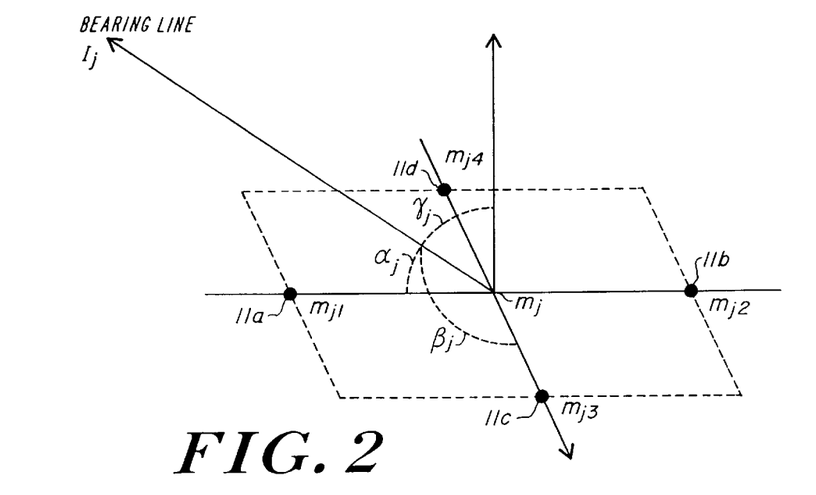
FIG. 2 details a configuration of sensors used in the apparatus of FIG. 1.

The sensors 11a–11d are preferably configured as centered orthogonal pairs, i.e., arranged in sets of two in at the endpoints of a cross configuration ("+") as shown in FIG. 2. There, a first such set includes sensors 11a, 11b disposed at locations $m_{j1}$ and $m_{j2}$, respectively, while a second such set includes sensors 11c, 11d disposed at locations $m_{j3}$ and $m_{j4}$, respectively. As shown in the drawing, the midpoint of a linear segment defined by points $m_{j1}$, $m_{j2}$ is substantially aligned with the midpoint of a linear segment defined by points $m_{j3}$, $m_{j4}$. The common midpoint of the sets is identified as $m_j$. Moreover, those linear segments are substantially perpendicular with one another.

Figure 4:
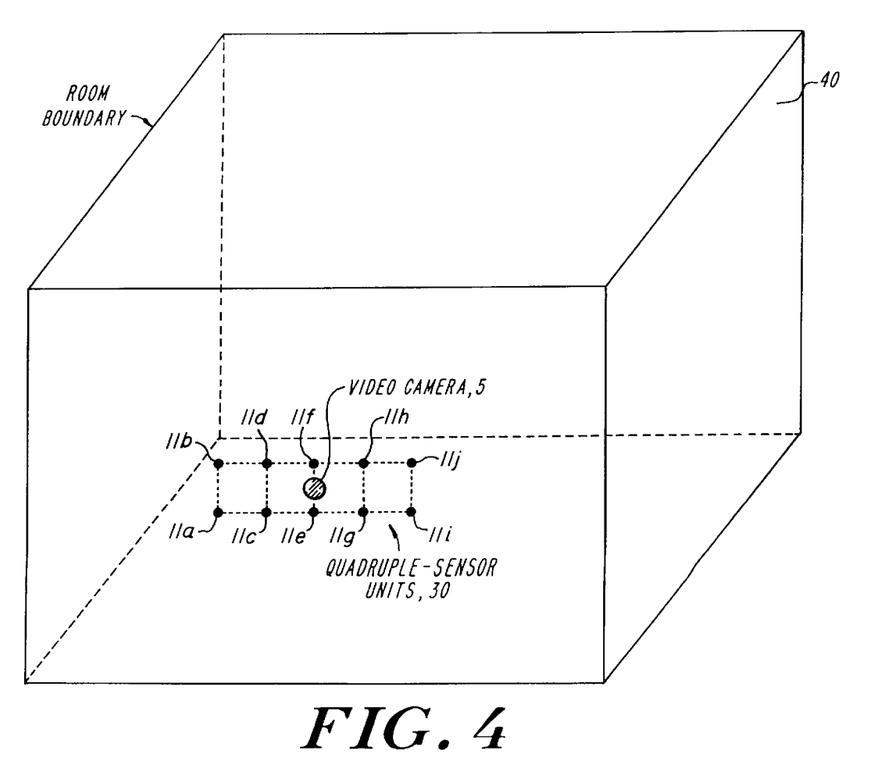
FIGS. 4 and 5 depict alternate arrangements of sensors for use with apparatus of the type shown in FIG. 2 to locate a source (and, for example, to steer a video camera) in a room.
Figure 5:
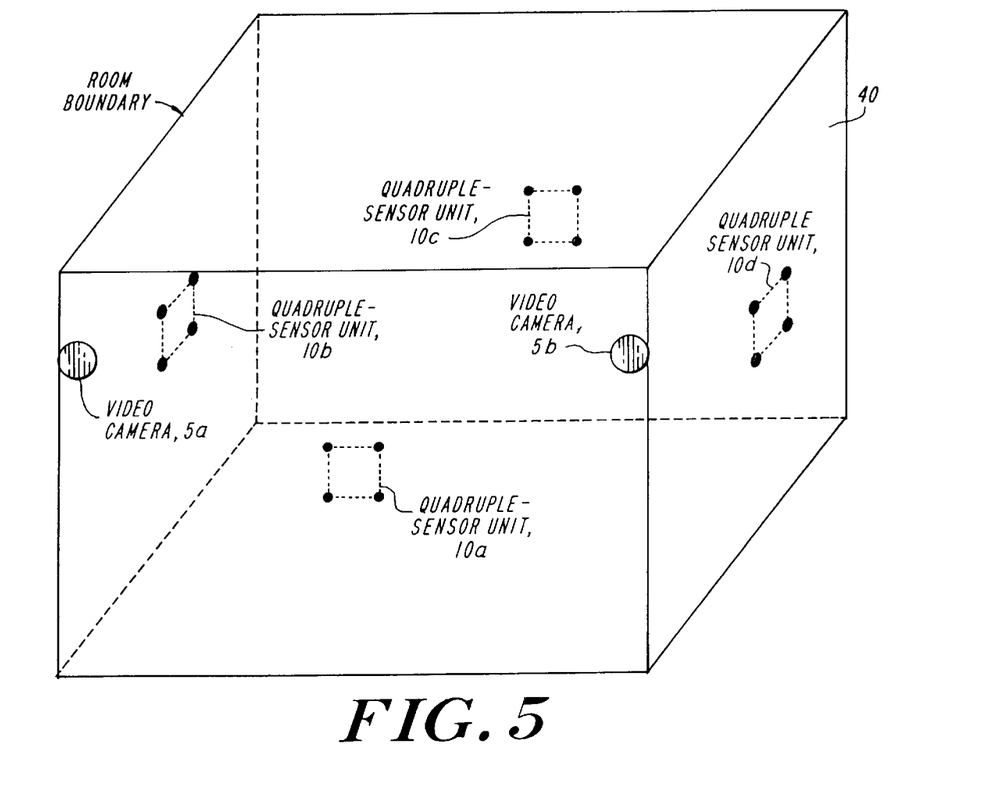

Referring again to FIG. 1, the sensors 11a, 11b, 11c, 11d are each connected with analog-to-digital converters 14a, 14b, 14c, 14d, as shown, of the type commonly used to convert analog electrical signals output by the sensors (in response to source signals) to digital electrical signals. Illustrated windows 16a, 16b, 16c, 16d are windowing elements that select discrete portions of the digital signals output by respective analog-to-digital converters 14a, 14b, 14c, 14d. In a preferred embodiment (e.g., for use with a sensor configuration as shown in FIGS. 4–5), analog-to-digital converters 14a, 14b, 14c, 14d have a 20 kHz sampling rate, while windows 16a, 16b, 16c, 16d are half-overlapping and have a 25.6 msec Hamming window.

Although the illustrated embodiment utilizes a combination of sensors 11a–11d, converters 14a–14d and windows 16a–16d to detect, convert and condition the source signals, those skilled in the art will appreciate that other embodiments capable of sensing the source signals in a manner suitable for processing in accord with the teachings below fall within the scope of the invention.

Once converted to digital form, the output of sensor set 11a, 11b is routed to time-delay estimator 18a, while the output of sensor set 11c, 11d is routed to time-delay estimator 18b. Estimator 18a determines time-difference of arrival estimate, $\tau_{j12}$, of source signals received at sensors 11a, 11b, along with a variance estimate, $\sigma^2_{j12}$, associated that time-difference of arrival estimate. Estimator 18b likewise determines a time-difference of arrival estimate, $\tau_{j34}$, and a variance estimate, $\sigma^2_{j34}$, for source signals received at sensors 11c, 11d. Estimators 18a, 18b can generate the time-difference of arrival estimates and variance estimates using conventional techniques, by way of non-limiting example, cross-correlation with peak-picking or frequency-based delay estimation.

Bearing line generator 20 is coupled to time-delay estimators 18a, 18b to receive time-delay of arrival estimates $\tau_{j12}$, $\tau_{j34}$. Generator 20 also receives, e.g., from local storage (not shown) signals representing the sensor locations, to wit, $m_{j1}$, $m_{j2}$, $m_{j3}$, $m_{j4}$.

For each set of sensors, i.e., the set comprising sensors 11a, 11b and the set comprising sensors 11c, 11d, surface-finding functionality within the generator identifies a conical surface representing potential source locations and having a direction angle θ, with respect to the line joining $m_1$ and $m_2$, in accord with the expression $$\theta = \cos^{-1}\left(\frac{c \cdot \tau}{|m_1 - m_2|}\right)$$

where c is a speed of propagation to the sensors of the signal generated source,
e.g., the speed of sound,
τ is a measured time difference of arrival of that signal at the sensors of the sensors set, i.e., $\tau_{j12}$ for sensor set 11a, 11b, and $\tau_{j34}$ for sensor set 11c, 11d,
$m_1$ is a location of a first sensor in the sensor set, i.e., $m_{j1}$ for sensor set 11a, 11b and $m_{j3}$ for sensor set 11c, 11d,
$m_2$ is a location of a second sensor in the sensor set, i.e., $m_{j2}$ for sensor set 11a, 11b and $m_{j4}$ for sensor set 11c, 11d.

For each pair of sensor sets, i.e., the pair comprising set 11a, 11b and set 11c, 11d, location-approximating functionality within the generator identifies a bearing line $l_j$ representing, with greater specificity than the aforementioned conical surfaces, potential locations of the source. The location-approximating functionality identifies that bearing line as the intersection of the conical surfaces associated with each of the sets in the pair, i.e., the conical surface associated with set 11a, 11b and the conical surface associates with the set 11c, 11d, in accord with the expression:

$$\cos^2 \alpha_j + \cos^2 \beta_j + \cos^2 \gamma_j = 1$$

where $\alpha_j$ is a first direction angle of the bearing line, e.g., from the linear segment defined by points $m_{j1}$, and $m_{j2}$, and is a direction angle (determined in accord with the equation for θ, above) from the centerpoint $m_j$ of the conical surface associated with the first sensor set 11a, 11b in the pair,
$\beta_j$ is a second direction angle of the bearing line, e.g., from the linear segment defined by points $m_{j3}$ and $m_{j4}$ and is a direction angle (determined in accord with the equation for θ, above) from the centerpoint $m_j$ of the conical surface associated with the second sensor set 11c, 11d,
$\gamma_j$ is a third direction angle of the bearing line, e.g., from a third axis, as shown, from the centerpoint $m_j$.

To this end, generator 20 determines a third direction angle $\gamma_j$ based on values for ($\alpha_j$ and $\beta_j$ determined by the surface-finding functionality (vis-a-vis the equation for θ, above) in accord with the expression:

$$\gamma_j = \arccos\sqrt{1 - \cos^2 \alpha_j - \cos^2 \beta_j}$$

The bearing line generator 20, including its surface-finding and location-approximating functionalities, can be implemented to determine the direction angles θ, $\alpha_j$, $\beta_j$, $\gamma_j$ in accord with the foregoing expressions using conventional programming and numerical analysis techniques on general purpose digital data processor or, preferably, on digital signal processing hardware constructed and operated in a manner conventional in the art.

A sequence of programming statements used in a preferred bearing line generator is included in the program listing below.

In one embodiment, signals representing the bearing line direction angles can be routed, e.g., via conductors 22, to stepping motor 6 for purposes of aiming camera or spotlight 5 to the source. For this purpose, camera or spotlight 5 is disposed at midpoint $m_j$ so that the direction angles $\alpha_j$, $\beta_j$, $\gamma_j$ can be directly correlated with appropriate camera angles.

Figure 3:
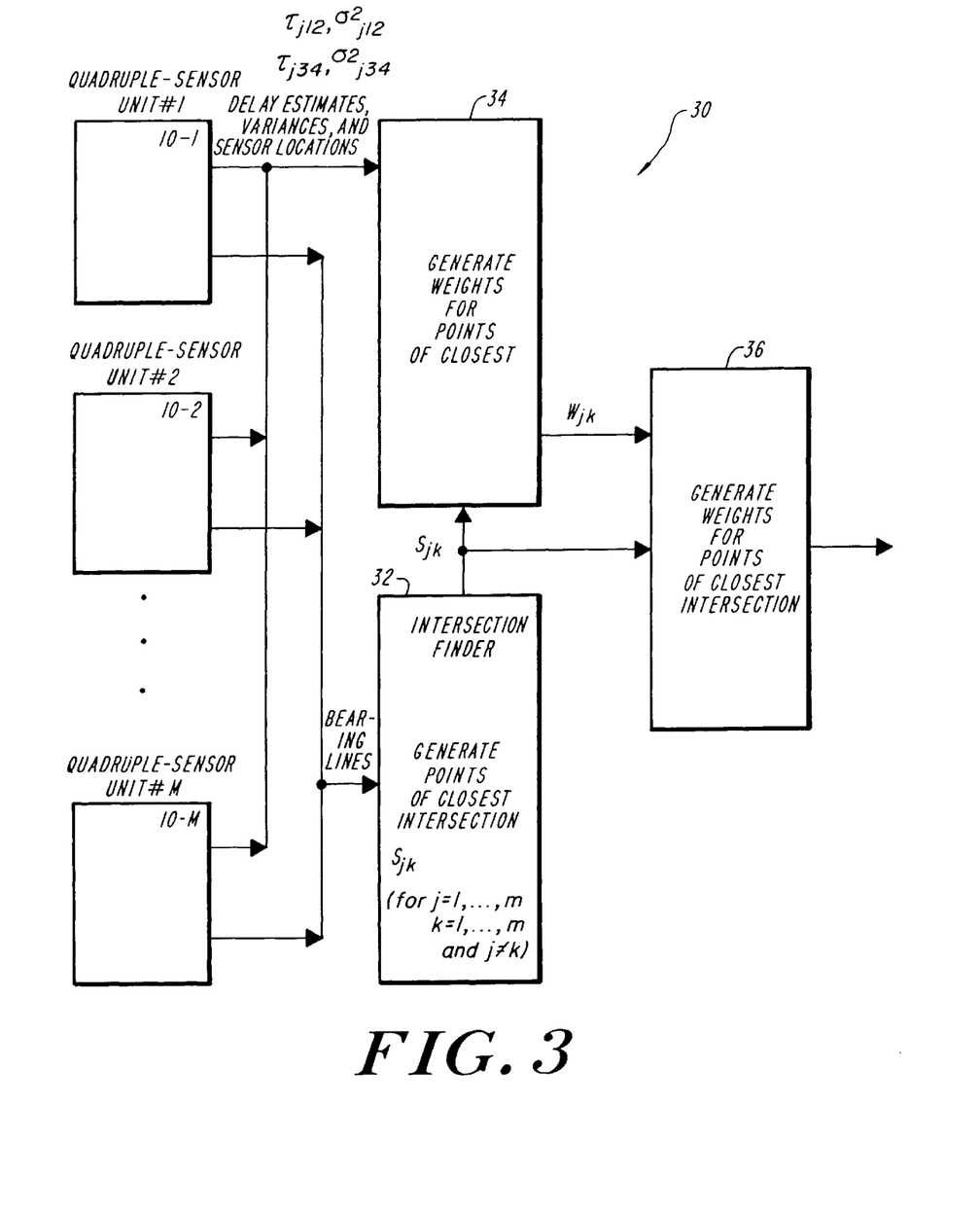
FIG. 3 depicts an apparatus for source localization according to the invention utilizing a plurality of quadruple-sensor elements of the type shown in FIG. 1.

FIG. 3 depicts an apparatus for source localization 30 according to the invention utilizing a plurality of quadruple-sensor elements, labelled 10-1, 10-2, . . . 10-M, each constructed and operated as described above. As shown in the drawing, each quadruple-sensor elements applies signals representing the bearing line identified by it (as well as the corresponding sensor locations) to intersection-finding element 32 to narrow further possible source locations by finding intersections, or points of closest intersection, of those bearing lines.

More particularly, for each pair of bearing lines, $l_j$ and $l_k$ (where j =1 . . . M, and k=1 . . . M, and j≠k), intersection-finder 32 determines points of closest intersection, $s_{jk}$ and $s_{kj}$, in accord with the expression $$s_{jk} = r_j a_j + m_j$$

$$s_{kj} = r_k a_k + m_k$$

where $s_{jk}$ is a point on line $l_j$ closest to line $l_k$
$s_{kj}$ is a point on line $l_k$ closest to line $l_j$
$a_j$ is a vector of cosines of direction angles $\alpha_j$, $\beta_j$ and $\gamma_j$ of the line $l_j$ from the centerpoint $m_j$ of the corresponding pair of sensor sets rotated relative to a global coordinate system,
$a_k$ is a vector of cosines of direction angles $\alpha_k$, $\beta_k$ and $\gamma_k$ of the line $l_k$ from the centerpoint $m_k$ of the corresponding pair of sensor sets rotated relative to a global coordinate system,
$r_j$ is a range of a point on the line $l_j$ from the centerpoint $m_j$ of the corresponding pair of sensor sets,
$r_k$ is a range of a point on the line $l_k$ from the centerpoint $m_k$ of the corresponding pair of sensor sets,
$r_j$ and $r_k$ are solutions to the expression $$[a_j : -a_k]\begin{bmatrix} r_j \\ r_k \end{bmatrix} = [m_k - m_j + d_{jk} \cdot (a_j \times a_k)]$$

$d_{jk}$ is defined in accord with the expression $$d_{jk} = \frac{|(a_j \times a_k) \cdot (m_j - m_k)|}{|a_j \times a_k|}$$

The intersection finder 32 can be implemented to determine the points of closest intersection, $s_{jk}$ and $s_{jk}$, in accord with the foregoing expressions using conventional programming and numerical analysis techniques on general purpose digital data processor or digital signal processing hardware constructed an operated in a manner conventional in the art.

A sequence of programming statements used in a preferred intersection finder 32 is included in the program listing below.

Although any of the points of closest intersection, $s_{jk}$ and $s_{jk}$, as determined above can be used to aiming camera or spotlight 5 toward the source, such steering is preferably accomplished via a weighted function of all points of closest intersection. To this end, the apparatus 30 utilizes weighting functionality 34 determine a weight $w_{jk}$ associated with each point of closest intersection in accord with the expression $$W_{jk} = \prod_{i=1}^{M} P(T(\{m_{l1}, m_{l2}\}, s_{jk}), \tau_{l12}, \sigma_{l12}^2) \cdot P(T(\{m_{l3}, m_{l4}\}, s_{jk}), \tau_{l34}, \sigma_{l34}^2)$$

where, M is a number of pairs of sensor sets, $m_{,l1}$ is the location of the first sensor in the first sensor set of the lth sensor set pair, $m_{,l2}$ is the location of the second sensor in the first sensor set of the lth sensor set pair, $m_{,l3}$ is the location of the first sensor in the second sensor set of the lth sensor set pair, $m_{,l4}$ is the location of the second sensor in the second sensor set of the lth sensor set pair, $\tau_{l12}$ is the measured time difference of arrival of said source signal at the sensors of a first sensor set of the lth pair of sensor sets, $\tau_{l34}$ is the measured time difference of arrival of said source signal at the sensors of a second sensor set of the lth pair of sensor sets, $\sigma_{12}^2$ is a variance of a measured time difference of arrival of said source signal at the sensors of a first sensor set of the lth pair of sensor sets, $\sigma_{34}^2$ is a variance of a measured time difference of arrival of said source signal at the sensors of a second sensor set of the lth pair of sensor sets, $P(x, m, \sigma^2)$ is the value a Gaussian distribution with mean m and variance $\sigma^2$ in accord with the expression $$P(x, m, \sigma^2) = \frac{1}{\sigma\sqrt{2\pi}} \exp\left(\frac{-(x-m)^2}{2\sigma^2}\right)$$

$T(\{m_{l1}, m_{l2}\},s)$ is the true time-difference of arrival of a source signal originating from location s at the sensors of an lth sensor set pair in accord with the expression $$T(\{m_1, m_2\}, s) = \frac{|s - m_1| - |s - m_2|}{c}$$

$m_1$ and $m_2$ are locations of the first and second sensors in a sensor set.

The weighting functionality 34 can be implemented to determine the weight $W_{jk}$ in accord with the foregoing expressions using conventional programming and numerical analysis techniques on general purpose digital data processor or, preferably, on digital signal processing hardware constructed and operated in a manner conventional in the art.

A sequence of programming statements used in a preferred weighting functionality 34 is included in the program listing below.

The output of weighting functionality 34, along with that of intersection finder 32, is applied to element 36 to identify a point ŝ representing the location of the source. Signals representing point ŝ can be applied to stepping motor 6 for purposes of aiming camera or spotlight 5 to the source. The point ŝ is determined in accord with the expression $$\hat{s} = \frac{\sum_{j=1}^{M} \sum_{k=1, k \neq j}^{M} W_{jk} s_{jk}}{\sum_{j=1}^{M} \sum_{k=1, k \neq j}^{M} W_{jk}}$$

where, M is a number of pairs of sensor sets, $s_{jk}$ represents points of closest intersection as defined above, and $W_{jk}$ represents a weight $W_{jk}$ associated with each such point of closest intersection.

The element 36 can be implemented to determine ŝ in accord with the foregoing expressions using conventional programming and numerical analysis techniques on general purpose digital data processor or, preferably, on digital signal processing hardware constructed and operated in a manner conventional in the art. A sequence of programming statements used in a preferred functionality 36 is included in the program listing below.

A program listing used in configuring a general purpose digital data processor (e.g., a personal computer or workstation) in a preferred practice of the invention to provide the functionality of the foregoing signal-processing elements (e.g., elements 18a, 18b, 20, 32, 34 and 36) is attached as an appendix hereto. That listing is in a format compatible with the commercially available MATLAB® product of The MathWorks, Inc. Those skilled in the art will readily appreciate that a sequence of instructions like those shown in the listing can be readily implemented on special purpose hardware for improved signal processing.

FIG. 4 depicts one preferred arrangement of sensors 11a, 11b, . . . , 11j for use with apparatus 30 to point a camera or spotlight 5 in a conference room 40. As illustrated, the sensors 11a, 11b, . . . , 11j are arranged in four quadruple-sensor groups 10a, 10b, 10c, 10d. Specifically, sensors 11a, 11b, 11c, 11d comprise quadruple-sensor groups 10a; sensors 11c, 11d, 11e, 11f comprise quadruple-sensor groups 10b; sensors 11e–11h comprise quadruple-sensor groups 10c; and sensors 11g–11j quadruple-sensor groups 10d.

To provide adequate coverage, for video teleconferencing purposes, of a conference room having dimensions of 4 meters×4 meters×3 meters, each sensor group 10a–10d occupies an area of 0.25 meters, with microphone sensors positioned in the corners in the configuration shown. The sensor groups are arranged in substantially the middle of one of the walls of room 40 at a height of approximately 2 meters. The video camera or spotlight 5 are of conventional design, and are mounted on a conventional stepping motor (not shown) for rotation in accord with source location estimates generated by apparatus 30, as described above.

FIG. 5 depicts an alternate arrangement of sensor groups 10a–10d for use with apparatus 30 to point two video cameras 5a, 5b. Each sensor group is positioned on a respective wall of room 40, at a height of approximately 2 meters. As above, the each sensor groups 10a–10d occupies an area 0.25 meters², with microphone sensors positioned in the corners in the configuration shown.

Those skilled in the art will appreciate, of course, that the sensor arrangement and placement will depend on the desired camera angle and estimated positions of conferees.

A further understanding of the invention may be attained by reference to the discussion which follows, which addresses the invention's theoretical bases and compares it with prior source-locating techniques, notably, those utilizing the Maximum Likelihood (ML) estimate and the spherical interpolation (SI) method.

The locationing problem addressed by the invention may be stated as follows. There are N pairs of sensors $m_{i1}$ and $m_{i2}$ for i $\in$[1,N]. The ordered triplet (x,y,z) of spatial coordinates for the sensors will be denoted by $m_{i1}$ and $m_{i2}$, respectively. For each sensor pair, a time-difference of arrival (TDOA) estimate, $\tau_i$, for a signal source located at s is available. The true TDOA associated with a source, s, and the $I^{th}$ sensor-pair is given by:

$$T(\{m_{i1}, m_{i2}\}, s) = \frac{|s - m_{i1}| - |s - m_{i2}|}{c} \quad (1)$$

where c is the speed of propagation in the medium. In practice, $\tau_i$ is corrupted by noise and in general, $\tau_i \neq T(\{m_{i1}, m_{i2}\}, s)$. In addition to the $\tau_i$, a variance estimate, $\sigma_i^2$, associated with each TDOA is also assumed to be available as a byproduct of the time-delay estimation procedure. Given these N sensor-pair, TDOA-estimate combinations:

$$\{m_{i1}, m_{i2}\}, \tau_i, \sigma_i^2 \text{ for } i=1, \ldots, N$$

it is desired to estimate the source location s.

If the TDOA estimates are assumed to be independently corrupted by additive Gaussian noise, the prior art Maximum Likelihood (ML) estimate $\hat{s}_{ML}$ is given by the least-squares estimate; see S. Kay. *Fundamentals of statistical Signal Processing: Estimation Theory*. Prentice Hall, First Edition, 1993.:

$$\hat{s}_{ML} = \underset{s}{\operatorname{argmin}} \left( \sum_{i=1}^{N} \frac{1}{\sigma_i^2} \cdot [\tau_i - T(\{m_{i1}, m_{i2}\}, s)]^2 \right) \quad (2)$$

However, since T({$m_{i1}$, $m_{i2}$},s) is a non-linear function of s, this error criteria is nonconvex and the solution of (2) requires burdensome, and frequently problematic, numerical search methods. For these reasons, the invention provides a closed-form source-location estimator with performance features comparable to those of the less tractable ML estimate. The locationing system of the invention, which relies on what we term as the linear intersection (LI) method, satisfies both these conditions.

For a specific sensor pair {$m_{i1}$, $m_{i2}$} and their associated TDOA estimate, $T_i$, the locus of potential source locations in 3-space forms one-half of a hyperboloid of two sheets. This hyperboloid is centered about the midpoint of $m_{i1}$, $m_{i2}$ and has the directed line segment $\overline{m_{i1}m_{i2}}$ as its axis of symmetry. For sources with a large source-range to sensor-separation ratio, the hyperboloid may be well-approximated by the cone with vertex at the sensors' midpoint, having $\overline{m_{i1}m_{i2}}$ as a symmetry axis, and a constant direction angle relative to this axis. The direction angle, $\theta_i$, for a sensor-pair, TDOA-estimate combination is given by:

$$\theta_i = \Theta(\{m_{i1}, m_{i2}\}, \tau_1) = \cos^{-1}\left(\frac{c \cdot \tau_i}{|m_{i1} - m_{i2}|}\right) \quad (3)$$

Now consider two pairs of sensors {$m_{j1}$, $m_{j2}$} and {$m_{j3}m_{j4}$}, where j is used to index the sets of sensor quadruples, along with their associated TDOA estimates, $\tau_{j12}$ and $\tau_{j34}$, respectively. The sensors' placement positions are constrained to lie on the midpoints of a rectangle. A local Cartesian coordinate system is established with unit vectors defined as $$\overline{x_j} = \frac{\overline{m_{j1}m_{j2}}}{|m_{j1} - m_{j2}|}, \quad \overline{y_j} = \frac{\overline{m_{j3}m_{j4}}}{|m_{j3} - m_{j4}|},$$

and $\overline{z_j}=\overline{x_j}\times\overline{y_j}$ with the origin at the common midpoint of the two pairs, denoted by $m_j$. This geometry is depicted in FIG. 2. The first sensor-pair TDOA-estimate approximately determines a cone with constant direction angle, $\alpha_j$, relative to the $\overline{x_j}$ axis, as given by (3). The second specifies a cone with constant direction angle, $\beta_j$, relative to the $\overline{y_j}$ axis. Each has a vertex at the local origin. If the potential source location is restricted to the positive-z half-space, the locus of potential source points common to these two cones is a line in 3-space. The remaining direction angle, $\gamma_j$, may be calculated from the identity $$\cos^2 \alpha_j + \cos^2 \beta_j + \cos^2 \gamma_j = 1$$

with $$0 \leq \gamma_j \leq \frac{\pi}{2}$$

and the line may be expressed in terms of the local coordinate system by the parametric equation $$l'_j = \begin{bmatrix} x_j \\ y_j \\ z_j \end{bmatrix} = r_j \begin{bmatrix} \cos\alpha_j \\ \cos\beta_j \\ \cos\gamma_j \end{bmatrix} = r_j a'_j$$

where $r_j$ is the range of a point on the line from the local origin at $m_j$ and $\alpha'_j$ is the vector of direction cosines.

The line $l'_j$ may then be expressed in terms of the global Cartesian coordinate system via the appropriate translation and rotation. Namely, $$l_j = r_j R_j \alpha'_j + m_j$$

where $R_j$ is the 3×3 rotation matrix from the $j^{th}$ local coordinate system to the global coordinate system. Alternatively, if $a_j$ represents the rotated direction cosine vector then $$l_j = r_j a_j + m_j$$

Given M sets of sensor quadruples and their corresponding bearing lines $$l_j = r_j a_j + m_j \text{ for } j=1, \ldots, M$$

the problem of estimating a specific source location remains. The approach taken by the invention is to calculate a number of potential source locations from the points of closest intersection for all pairs of bearing lines and use a weighted average of these locations to generate a final source-location estimate. More specifically, given two such bearing lines $$l_j = r_j a_j + m_j$$

$$l_k = r_k a_k + m_j$$

the shortest distance between the lines is measured along a line parallel to their common normal and is given by:

$$d_{jk} = \frac{|(a_j \times a_k) \cdot (m_j - m_k)|}{|a_j \times a_k|}$$

Accordingly, the point on $l_j$ with closest intersection to $l_k$ (denoted by $s_{jk}$) and the point on $l_k$ with closest intersection to $l_j$ (denoted by $s_{kj}$) may be found by first solving for the local ranges, $r_j$ and $r_k$, and substituting these values into (4). The local ranges are found via solution of the overconstrained matrix equation:

$$[a_j \vdots -a_k]\begin{bmatrix} r_j \\ r_k \end{bmatrix} = [m_k - m_j + d_{jk} \cdot (a_j \times a_k)]$$

Each of the potential source locations is weighted based upon its probability conditioned on the observed set of 2M sensor-pair, TDOA-estimate combinations. The TDOA estimates are assumed to be normal distributions with mean given by the estimate itself. The weight associated with the potential source location, $s_{jk}$, is calculated from:

$$W_{jk} = \prod_{l=1}^{M} P(T(\{m_{l1}, m_{l2}\}, s_{jk}), \tau_{l12}, \sigma_{l12}^2) \cdot \qquad (5)$$

$$P(T(\{m_{l3}, m_{l4}\}, s_{jk}, )\tau_{l34}, \sigma_{l34}^2)$$

where $P(I, m, \sigma^2)$ is the value of a Gaussian distribution with mean m and variance $\sigma^2$ evaluated at x, i.e.

$$P(I, m, \sigma^2) = \frac{1}{\sigma\sqrt{2\pi}} \exp\left(\frac{-(I-m)^2}{2\sigma^2}\right)$$

The final location estimate, which will be referred as the linear intersection estimate ($\hat{s}_{LI}$), is then calculated as the weighted average of the potential source locations:

$$\hat{s}_{LI} = \frac{\sum_{j=1}^{M} \sum_{k=1, k \neq j}^{M} W_{jk} s_{jk}}{\sum_{j=1}^{M} \sum_{k=1, k \neq j}^{M} W_{jk}} \qquad (6)$$

As a means of evaluating apparatus according to the invention, the statistical characteristics of the LIlocalization was compared with that of the prior art spherical interpolation (SI) method, disclosed in Smith et al, "Closed-Form Least-Squares Source Location Estimation From Range-Difference Measurements," *IEEE Trans. Acoust., Speech, Signal Processing*, ASSP-35(12):1661–1669, December 1987. The comparison was made through a series of Monte Carlo simulations modeled after those disclosed in that article.

Figure 6:
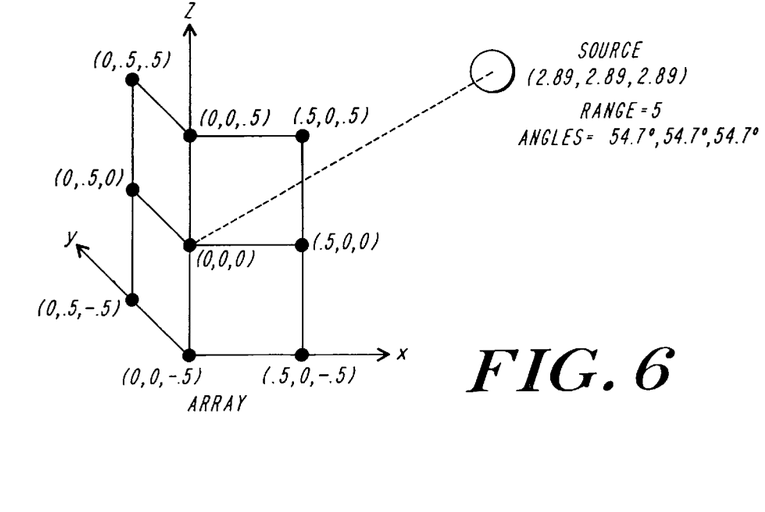
FIG. 6 depicts a simulated sensor array used in connection with a simulated example of the invention.

The experimental set-up, a nine-sensor orthogonal array with half-meter spacings and a source located at a range of 5 meters with equal direction angles, is depicted in FIG. 6. The true TDOA values (1) were corrupted by additive white Gaussian noise. 100 trials were performed at each of 11 noise levels ranging from a standard deviation the equivalent of $10^{-3}$ meters to $10^{-1}$ meters when scaled by the propagation speed of sound in air (c≈342 m/s). The LI method, i.e., that of the invention, partitioned the array into 4 square sensor quadruples and required the evaluation of 8 TDOA estimates, one for each diagonal sensorpair. The SI method required that all the TDOA values be relative to a reference sensor. The sensor at the origin was chosen for this purpose and the TDOA for each of the remaining 8 sensors relative to the reference were calculated. In addition to calculating the LI and SI estimates, the ML estimate (2) was computed via a quasi-Newton search method with the initial guess set equal to the true location (clearly this is not a practical algorithm since it requires prior knowledge of the actual source location).

Figure 7:
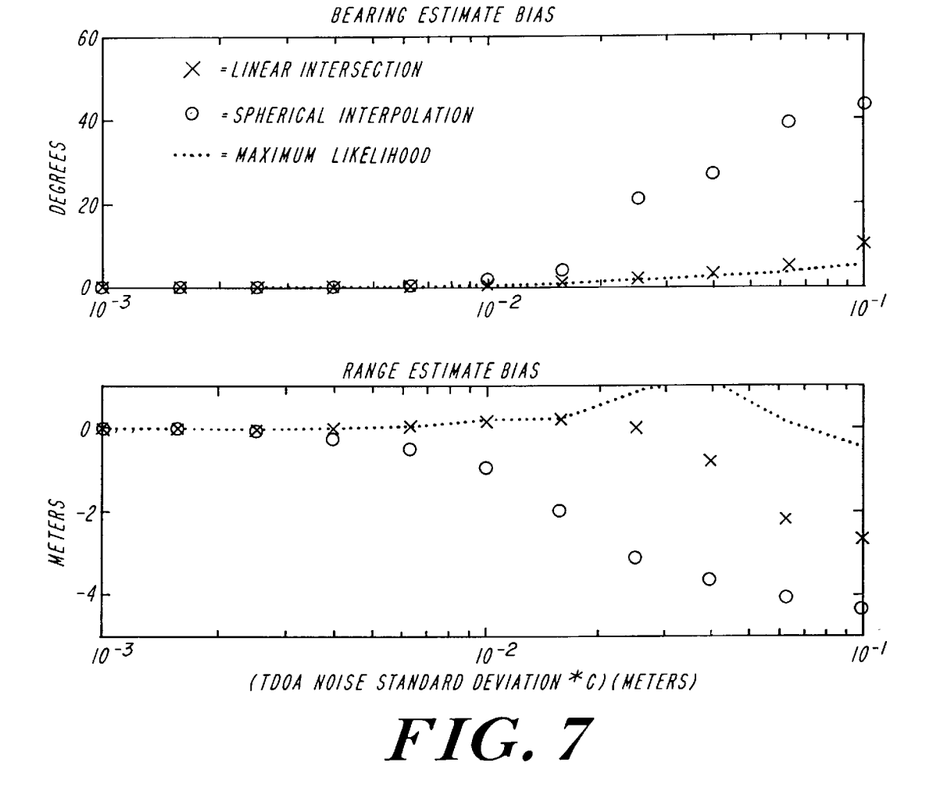
FIGS. 7–9 illustrate results of the simulation depicted in FIG. 6.
Figure 8:
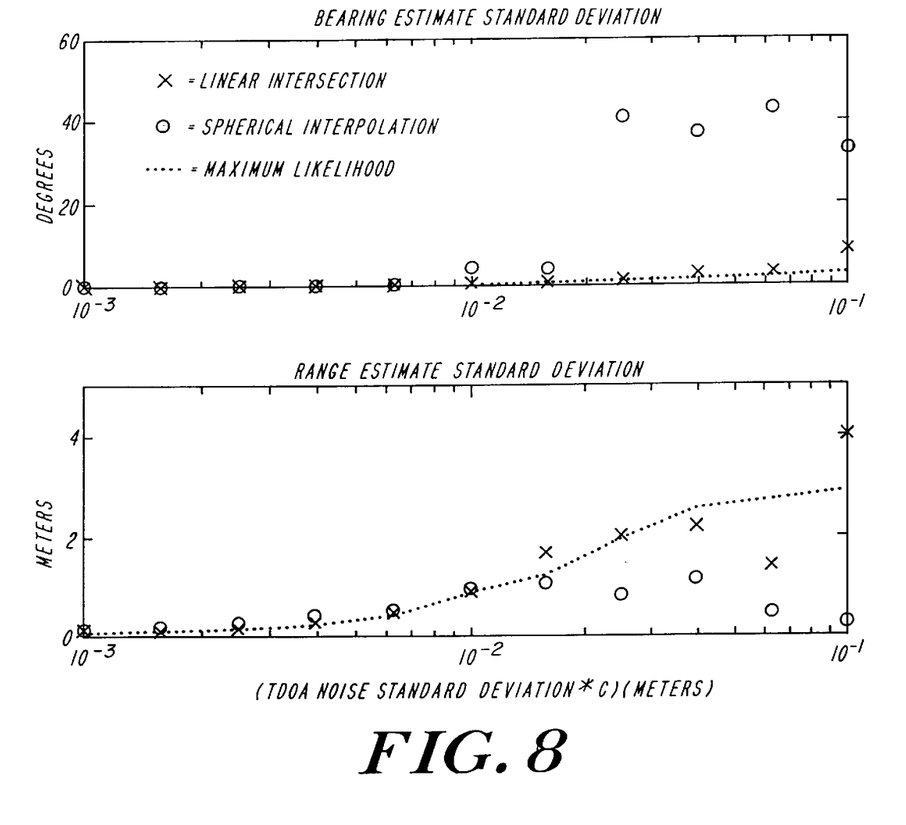
Figure 9:
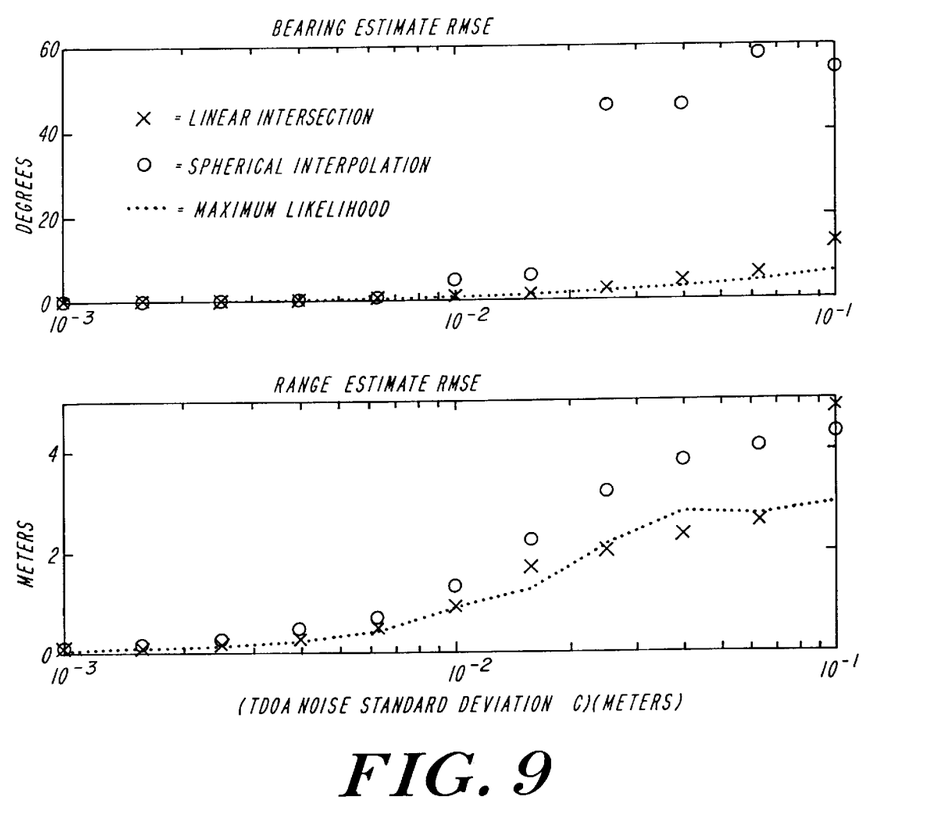

FIGS. 7–9 summarize the results of these simulations. FIG. 7 plots the sample bias for the estimated source bearing and range for each of the estimation methods as a function of the level of noise added to the true TDOA values. While each of the methods exhibits some degree of bias in the noisier trials, the situation is most extreme for the SI method. This tendency for the SI method to consistently bias its estimates towards the origin was noted in Smith et al, supra.

The apparatus according to the invention performs comparably to the ML estimate for all but the most extreme noise conditions. FIG. 8 plots the sample standard deviations. For the standard deviation of the bearing estimates, a trend similar to the bearing bias is observed. The SI method's performance decays rapidly for noise levels above $10^{-2}$ meters. However, in terms of the range, each of the closed form estimators displays a smaller variance than the ML estimator at the higher noise conditions. This is a consequence of the estimator biases observed previously. Finally, FIG. 8 shows the root-mean-square errors (RMSE). Once again, the apparatus according to the invention produces results closely tracking the ML estimator in all but the most extreme condition while the SI method exhibits a marked performance decrease in both bearing and range for moderate and large noise levels.

Simulations performed over a broad range of source positions exhibit trends similar to those in FIGS. 7–9. The LI estimator is consistently less sensitive to noise conditions and possesses a significantly smaller bias in both its range and bearing estimates when compared to the SI estimator.

SUMMARY

Described above is an improved method and apparatus for source localization meeting the objects set forth above. As indicated by the foregoing examples, it is a robust and accurate estimator, closely modeling the prior art ML estimator, and clearly outperforming a representative algorithm. An advantage of the systems operating in accord with the invention is that localization in 3-space can be performed with a 2-dimensional array. Also, since those systems require the estimation of delays between sensors other than those in the local sub-array, the sub-arrays can be placed far apart and delay-estimation processing can be performed locally.

Those skilled in the art will appreciate that the embodiments described above are provided by way of example only and that other embodiments incorporating additions, substitutions or other modifications thereto fall within the scope of the invention, of which we claim:

1. A camera steering apparatus for use in a video teleconferencing system, the apparatus being responsive to at least three microphones arrangeable in a plurality of sets, each set including two or more microphones, the apparatus comprising:
   a data processor, coupled with the microphones, for responding to receipt of a source signal by the microphones, the data processor including
   i) means for identifying a bearing line, each bearing line representing a locus of potential source locations, and each bearing line being defined as a function of the locations of microphones in the plurality of sets and a time difference of arrival signal of the source signal at those microphones, and ii) intersection-finding means for generating a location signal representing a location of the source as a function of the points of closest intersection of a plurality of bearing lines, and at least one motor for steering a camera towards the source as a function of the location signal.

2. The camera steering apparatus according to claim 1, wherein the means for identifying a bearing line further includes surface-finding means for identifying a geometric surface representing a locus of potential source locations as a function of locations of the microphones in a set and a time difference of arrival of the source signal at those microphones, and wherein the bearing line is defined as a function of an intersection of geometric surfaces identified by two or more microphone sets.

3. The camera steering apparatus according to claim 1, further including microphones designed for picking up speech such that the camera tracks the location of an active speaker.

4. The camera steering apparatus according to claim 1, further including an analog-to-digital converter coupled with the microphone for converting analog electrical signals output by the microphone to digital electrical signals.

5. The camera steering apparatus according to claim 4, further including windowing elements for selecting discrete portions of the digital electrical signals.

6. The apparatus according to claim 1, wherein
A. each microphone set includes two microphones, and
B. at least one pair of microphone sets are substantially centered and orthogonal to one another, each such pair of substantially centered and orthogonal sets being arranged such that
  (i) a linear segment defined by microphone locations of one of the sets in the pair is substantially orthogonal to a linear segment defined by microphone locations of the other of the sets in the pair,
  (ii) centerpoints of the linear segments defined by microphone locations of each of the sets are substantially aligned with one another.

7. The apparatus according to claim 2, wherein the surface-finding means includes means for identifying, in connection with receipt of a source signal by each microphone set, a substantially conical surface representing a locus of potential source locations, the substantially conical surface having a direction angle $\theta$, with respect to a linear segment defined by $m_1$ and $m_2$, in accord with the expression $$\theta = \cos^{-1}\left(\frac{c \cdot \tau}{|m_1 - m_2|}\right)$$

where c is a speed of propagation of the source signal,
$\tau$ is a measured time difference of arrival of the source signal at the microphones of the microphone set,
$m_1$ is a location of a first microphone in the microphone set, and
$m_2$ is a location of a second microphone in the microphone set.

8. The apparatus according to claim 7, wherein the means for identifying a bearing line includes means for identifying a line defined as a function of an intersection of the substantially conical surfaces, the line having direction angles $\alpha$, $\beta$ and $\gamma$ from the substantially aligned centerpoints, the direction angles being defined in accord with the expression $$\cos^2 \alpha + \cos^2 \beta + \cos^2 \gamma = 1$$

where $\alpha$ is a first direction angle of the line from the substantially aligned centerpoints and is a direction angle of a conical surface for a first microphone set,
$\beta$ is a second direction angle of the line from the substantially aligned centerpoints and is a direction angle of a conical surface for a second microphone set that is substantially centered and orthogonal to the first microphone set,
$\gamma$ is a third direction angle of the line from the substantially aligned centerpoints.

9. The apparatus according to claim 1, wherein the intersection-finding means includes means for identifying points of closest intersection, $s_{jk}$ and $s_{kj}$, of two such lines, $l_j$ and $l_k$, in accord with the expression $$s_{jk} = r_j a_j + m_j$$

$$s_{kj} = r_k a_k + m_k$$

where $s_{jk}$ is a point on line $l_j$ closest to line $l_k$
$s_{kj}$ is a point on line $l_k$ closest to line $l_j$
$a_j$ is a vector of cosines of direction angles $\alpha_j$, $\beta_j$ and $\gamma_j$ of the line $l_j$ from the substantially aligned centerpoints rotated relative to a global coordinate system,
$a_k$ is a vector of cosines of direction angles $\alpha_k$, $\beta_k$ and $\gamma_k$ of the line $l_k$ from the substantially aligned centerpoints rotated relative to a global coordinate system,
$m_j$ and $m_k$ is a location of the substantially aligned centerpoints,
$r_j$ is a range of a point on the line $l_j$ from the substantially aligned centerpoints,
$r_k$ is a range of a point on the line $l_k$ from the substantially aligned centerpoints, and
where $r_j$ and $r_k$ are solutions to the expression $$[a_j \vdots -a_k]\begin{bmatrix} r_j \\ r_k \end{bmatrix} = [m_k - m_j + d_{jk} \cdot (a_j \times a_k)]$$

where $d_{jk}$ is defined in accord with the expression $$d_{jk} = \frac{|(a_j \times a_k) \cdot (m_j - m_k)|}{|a_j \times a_k|}.$$

10. The apparatus according to claim 9, wherein the intersection-finding means includes means for generating the location signal to as a weighted function of the closest points of closest intersection of a plurality of the lines.

11. The apparatus according to claim 10, wherein the intersection-finding means includes means for generating the location signal as a function of a point $\hat{s}$ defined in accord with the expression $$\hat{s} = \frac{\sum_{j=1}^{M} \sum_{k=1, k \neq j}^{M} w_{jk} s_{jk}}{\sum_{j=1}^{M} \sum_{k=1, k \neq j}^{M} w_{jk}}$$

where $W_{jk}$ is a weight associated with each potential source location in accord with the expression $$W_{jk} = \prod_{i=1}^{M} P(T(\{m_{l1}, m_{l2}\}, s_{jk}), \tau_{l12}, \sigma_{l12}^2) \cdot$$

$$P(T(\{m_{l3}, m_{l4}\}, s_{jk}), \tau_{l34}, \sigma_{l34}^2)$$

M is a number of pairs of microphone sets, $m_{l1}$ is the location of the first microphone in the first microphone set of the lth microphone set pair, $m_{l2}$ is the location of the second microphone in the first microphone set of the lth microphone set pair, $m_{l3}$ is the location of the first microphone in the second microphone set of the lth microphone set pair, $m_{l4}$ is the location of the second microphone in the second microphone set of the lth microphone set pair, $\tau_{l12}$ is the measured time difference of arrival of the source signal at the microphones of a first microphone set of the lth pair of microphone sets, $\tau_{l34}$ is the measured time difference of arrival of the source signal at the microphones of a second microphone set of the lth pair of microphone sets, $\sigma_{12}^2$ is a variance of a measured time difference of arrival of the source signal at the microphones of a first microphone set of the lth pair of microphone sets, $\sigma_{34}^2$ is a variance of a measured time difference of arrival of the source signal at the microphones of a second microphone set of the lth pair of microphone sets, $P(x,m,\sigma^2)$ is the value a Gaussian distribution with mean m and variance $\sigma^2$ in accord with the expression $$P(x, m, \sigma^2) = \frac{1}{\sigma\sqrt{2\pi}} \exp\left(\frac{-(x-m)^2}{2\sigma^2}\right)$$

$T(\{m_{l1}, m_{l2}\},s)$ is a true time-difference of a source signal originating at position s at the microphones of an lth microphone set pair in accord with the expression $$T(\{m_1, m_2\}, s) = \frac{|s - m_1| - |s - m_2|}{c}$$

$m_1$ and $m_2$ are locations of the first and second microphones in a microphone set.

12. A steerable camera for use in a video teleconferencing system, the steerable camera being responsive to at least three microphones arranged in a plurality of sets, each set including two or more microphones, the steerable camera comprising:
a moveable camera,
a data processor, coupled with the microphones, for responding to receipt of a source signal by the microphones, the data processor including
i) means for identifying a bearing line, each bearing line representing a locus of potential source locations, and each bearing line being defined as a function of the locations of microphones in the plurality of sets and a time difference of arrival signal of the source signal at those microphones, and
ii) intersection-finding means for generating a location signal representing a location of the source as a function of the points of closest intersection of a plurality of bearing lines, and
a motor coupled with the moveable camera for steering the camera towards the source as a function of the location signal.

13. Method for steering a camera towards a location of a source that generates source signals, the method comprising the steps of
A. receiving the source signal with at least three microphones arranged in a plurality of sets, each set including two or more microphones,
B. identifying a bearing line, each bearing line representing a locus of potential source locations, and each bearing line being defined as a function of the locations of microphones in the plurality of sets and a time difference of arrival signal of the source signal at those microphones,
C. generating a location signal representing a location of the source as a function of the points of closest intersection of a plurality of bearing lines, and
D. steering the camera towards the location of the source as a function of the location signal.

14. The method according to claim 13, wherein the step of identifying a bearing line includes finding a geometric surface representing a locus of potential source locations as a function of locations of the microphones in a set and a time difference of arrival of the source signal at those microphones, and wherein the bearing line is determined by identifying an intersection of the geometric surfaces identified by two or more microphone sets.

15. The method according to claim 14, wherein the surface-finding step includes the step of identifying, in connection with receipt of a source signal by each microphone set, a substantially conical surface representing a locus of potential source locations, the substantially conical surface having a direction angle $\theta$, with respect to a linear segment defined by $m_1$ and $m_2$, in accord with the expression $$\theta = \cos^{-1}\left(\frac{c \cdot \tau}{|m_1 - m_2|}\right)$$

where c is a speed of propagation of the source signal,
$\tau$ is a measured time difference of arrival of the source signal at the microphones of the microphone set,
$m_1$ is a location of a first microphone in the microphone set, and
$m_2$ is a location of a second microphone in the microphone set.

16. The method according to claim 15, wherein the step of identifying a bearing line includes means identifying a line defined as a function of an intersection of the substantially conical surfaces, the line having direction angles $\alpha$, $\beta$ and $\gamma$ from the substantially aligned centerpoints, the direction angles being defined in accord with the expression $$\cos^2 \alpha + \cos^2 \beta + \cos^2 \gamma = 1$$

where $\alpha$ is a first direction angle of the line from the substantially aligned centerpoints and is a direction angle of a conical surface for a first microphone set,
$\beta$ is a second direction angle of the line from the substantially aligned centerpoints and is a direction angle of a conical surface for a second microphone set that is substantially centered and orthogonal to the first microphone set, γ is a third direction angle of the line from the substantially aligned centerpoints.

17. The method according to claim 13, further including the steps of receiving source signals with microphones designed for picking up speech and tracking the location of an active speaker with the camera.

18. The method according to claim 13, further including the step of converting the analog electrical signals generating by the microphones into digital electrical signals.

19. The method according to claim 18, further including the step of windowing selected discrete portions of the digital electrical signals.

20. The method according to claim 13, further including the steps of
   A. providing each microphone set with two microphones, and
   B. arranging at least one pair of microphone sets to be substantially centered and orthogonal to one another, each such pair of substantially centered and orthogonal sets being arranged such that
      (i) a linear segment defined by microphone locations of one of the sets in the pair is substantially orthogonal to a linear segment defined by microphone locations of the other of the sets in the pair,
      (ii) centerpoints of the linear segments defined by microphone locations of each of the sets are substantially aligned with one another.

21. The method according to claim 13, wherein the step of generating a location signal includes the step of identifying points of closest intersection, $s_{jk}$ and $s_{kj}$, of two such bearing lines, $l_j$ and $l_k$, in accord with the expression $$s_{jk} = r_j a_j + m_j$$
$$s_{kj} = r_k a_k + m_j$$

where $s_{jk}$ is a point on line $l_j$ closest to line $l_k$
$s_{kj}$ is a point on line $l_k$ closest to line $l_j$
$a_j$ is a vector of cosines of direction angles $\alpha_j$, $\beta_j$ and $\gamma_j$ of the line $l_j$ from the substantially aligned centerpoints rotated relative to a global coordinate system,
$a_k$ is a vector of cosines of direction angles $\alpha_k$, $\beta_k$ and $\gamma_k$ of the line $l_k$ from the substantially aligned centerpoints rotated relative to a global coordinate system,
$m_j$ and $m_k$ is a location of the substantially aligned centerpoints,
$r_j$ is a range of a point on the line $l_j$ from the substantially aligned centerpoints,
$r_k$ is a range of a point on the line $l_k$ from the substantially aligned centerpoints, and
where $r_j$ and $r_k$ are solutions to the expression $$[a_j \vdots -a_k]\begin{bmatrix} r_j \\ r_k \end{bmatrix} = [m_k - m_j + d_{jk} \cdot (a_j \times a_k)]$$

where $d_{jk}$ is defined in accord with the expression $$d_{jk} = \frac{|(a_j \times a_k) \cdot (m_j - m_k)|}{|a_j \times a_k|}.$$

22. The method according to claim 21, wherein the step of generating a location signal includes the step of generating the location signal as a weighted function of the closest points of closest intersection of a plurality of the bearing lines.

23. The method according to claim 22, wherein the step of generating a location signal includes the step of generating the location signal as a function of a point ŝ defined in accord with the expression $$\hat{s} = \frac{\sum_{j=1}^{M} \sum_{k=1, k \neq j}^{M} W_{jk} s_{jk}}{\sum_{j=1}^{M} \sum_{k=1, k \neq j}^{M} W_{jk}}$$

where $W_{jk}$ is a weight associated with each point of closest intersection in accord with the expression $$W_{jk} = \prod_{l=1}^{M} P(T(\{m_{l1}, m_{l2}\}, s_{jk}), \tau_{l12}, \sigma_{l12}^2) \cdot$$

$$P(T(\{m_{l3}, m_{l4}\}, s_{jk}), \tau_{l34}, \sigma_{l34}^2)$$

M is a number of pairs of microphone sets,
$m_{l1}$ is the location of the first microphone in the first microphone set of the lth microphone set pair,
$m_{l2}$ is the location of the second microphone in the first microphone set of the lth microphone set pair,
$m_{l3}$ is the location of the first microphone in the second microphone set of the lth microphone set pair,
$m_{l4}$ is the location of the second microphone in the second microphone set of the lth microphone set pair,
$\tau_{l12}$ is the measured time difference of arrival of the source signal at the microphones of a first microphone set of the lth pair of microphone sets,
$\tau_{l34}$ is the measured time difference of arrival of the source signal at the microphones of a second microphone set of the lth pair of microphone sets,
$\sigma_{12}^2$ is a variance of a measured time difference of arrival of the source signal at the microphones of a first microphone set of the lth pair of microphone sets,
$\sigma_{34}^2$ is a variance of a measured time difference of arrival of the source signal at the microphones of a second microphone set of the lth pair of microphone sets,
$P(x,m,\sigma^2)$ is the value a Gaussian distribution with mean m and variance $\sigma^2$ in accord with the expression $$P(x, m, \sigma^2) = \frac{1}{\sigma\sqrt{2\pi}} \exp\left(\frac{-(x-m)^2}{2\sigma^2}\right)$$

$T(\{m_{l1}, m_{l2}\}, s)$ is a true time-difference of arrival of a source signal originating a position s at the microphones of an lth microphone set pair in accord with the expression $$T(\{m_1, m_2\}, s) = \frac{|s - m_1| - |s - m_2|}{c}$$

$m_1$ and $m_2$ are locations of the first and second microphones in a microphone set.

* * * * *

UNITED STATES PATENT AND TRADEMARK OFFICE
CERTIFICATE OF CORRECTION

PATENT NO. : 6,243,471 B1
DATED : June 5, 2001
INVENTOR(S) : Michael S. Brandstein et al.

It is certified that error appears in the above-identified patent and that said Letters Patent is hereby corrected as shown below:

Title page,
Item [57], ABSTRACT,
Line 15, please delete "generating"
Lines 16-17, please delete "the plural ones" and insert -- of a plurality --

Column 1,
Line 45, please delete "there"
Line 54, please replace "only single, fixed camera installed" with -- only a single, fixed camera is installed --
Line 65, please replace "invention provide" with -- invention is to provide --

Column 2,
Line 55, please delete "the plural ones" and insert -- of a plurality --

Column 3,
Line 3, please delete "the plural ones" and insert -- of a plurality --

Column 4,
Line 53, please replace insert -- with -- before "that"

Column 5,
Line 30, please delete "associates" and insert -- associated --
Line 50, please delete "($α_j$" and insert -- $α_j$ --

Column 6,
Line 10, please replace "10-M" with --10-M --
Line 12, please delete "elements" and insert -- element --
Line 55, please delete the second occurrence of "$s_{jk}$" and insert -- $s_{kj}$ --
Line 59, please delete "an" and insert -- and --
Line 64, please delete "$s_{jk}$" and insert -- $s_{kj}$ --

UNITED STATES PATENT AND TRADEMARK OFFICE
CERTIFICATE OF CORRECTION

PATENT NO. : 6,243,471 B1
DATED : June 5, 2001
INVENTOR(S) : Michael S. Brandstein et al.

It is certified that error appears in the above-identified patent and that said Letters Patent is hereby corrected as shown below:

Column 7,
Line 1, please replace "determine a weight $w_{jk}$" and insert -- to determine a weight $W_{jk}$ --
Line 16, please delete "$m_{,l3}$" and insert -- $m_{l3}$ --
Line 19, please delete "$m_{,l4}$" and insert -- $m_{l4}$ --

Column 8,
Line 45, please replace "metersx4 metersx3 meters" with -- meters x 4 meters x 3 meters --
Line 46, please delete "meters" and insert -- meters$^2$ --
Line 58, please replace "the each" with -- each --
Line 66, please delete "bases" and insert -- basis --

Column 9,
Line 30, please delete "*statistical*" and insert -- *Statistical* --
Line 49, please delete "$T_i$" and insert -- $\tau_i$ --
Line 60, please delete "$m_{i2},$}" and insert -- $m_{i2}$} --
Line 65, please delete "{$m_{j3}m_{j4}$}" and insert -- {$m_{j3}, m_{j4}$} --

Column 10,
Lines 37 and 41, please delete "$\alpha'_j$" and insert -- $a'_j$ --
Line 46, please delete "$a_j$" and insert -- *aj* --

Column 11,
Line 37, please replace "referred as" with -- referred to as --
Line 49, please delete "L11ocalization" with -- LI localization --

Column 12,
Line 58, please delete the words "use in"
Line 64, please replace "of a source signal" with -- of a speech source signal --

UNITED STATES PATENT AND TRADEMARK OFFICE
CERTIFICATE OF CORRECTION

PATENT NO. : 6,243,471 B1
DATED : June 5, 2001
INVENTOR(S) : Michael S. Brandstein et al.

It is certified that error appears in the above-identified patent and that said Letters Patent is hereby corrected as shown below:

Column 14,
Line 54, please delete "signal to as a" and insert -- signal as a --

Column 15,
Line 51, please delete the words "use in"
Line 58, please delete "a source" and insert -- a speech source --

Column 16,
Line 6, please replace "a camera towards" with -- a camera in a video teleconference system towards --
Line 7, please replace "generates source" with -- generates speech source --
Lines 9 and 16, please replace "the source" with -- the speech source --

Signed and Sealed this

Eighth Day of April, 2003

JAMES E. ROGAN
*Director of the United States Patent and Trademark Office*